No. 674,122. Patented May 14, 1901.
J. A. PERKINS.
ROLLER BEARING.
(Application filed July 5, 1900.)
(No Model.)
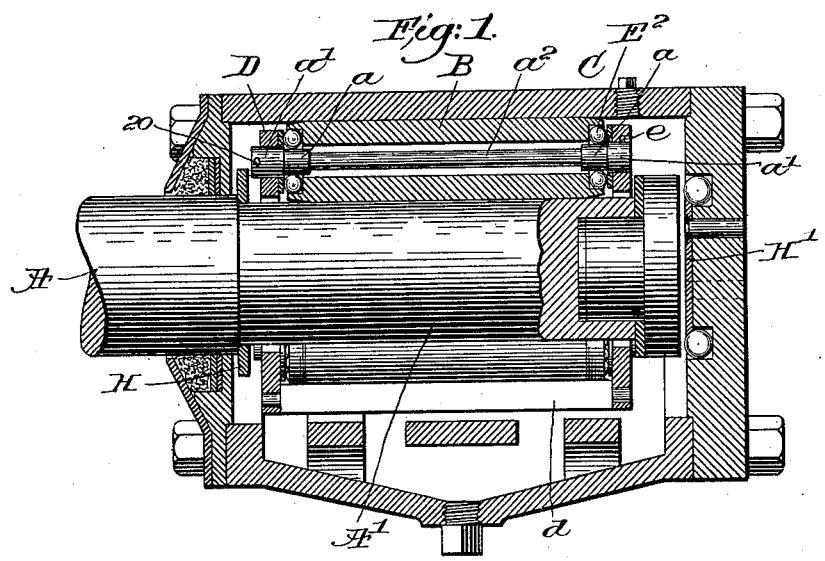
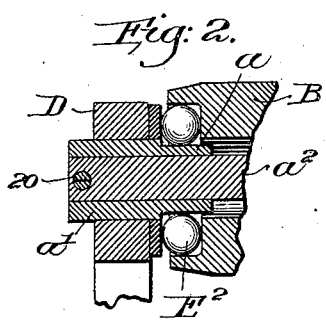
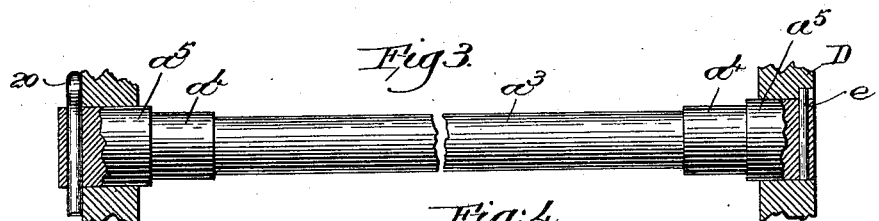
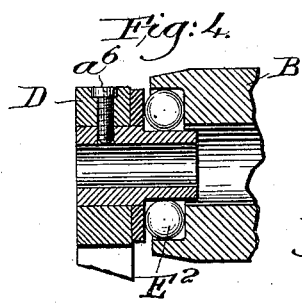
Witnesses,
Edward F. Allen.
Thomas F. Drummond.
Inventor,
Julius A. Perkins,
by Crosby Gregory
attys.

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

ROLLER-BEARING.

SPECIFICATION forming part of Letters Patent No. 674,122, dated May 14, 1901.

Application filed July 5, 1900. Serial No. 22,526. (No model.)

*To all whom it may concern:*

Be it known that I, JULIUS A. PERKINS, a citizen of the United States, residing at Omaha, county of Douglas, State of Nebraska, have invented an Improvement in Roller-Bearings, of which the following description, in connection with the accompanying drawings, is a specification, like characters on the drawings representing like parts.

This invention relates to roller-bearings of the class wherein a bearing-roller is revolubly sustained in a cage by suitable supports; and the invention relates more especially to a novel construction of alining support or spindle for sustaining the balls entering the chambers of the bearing-rollers.

It is customary in railway management to have established places where the entire car equipment is inspected to ascertain if everything is in proper normal or working condition before the cars are again started out. I desire to make my bearing in such form that it may be readily inspected with the car equipment.

In the inspection of a car it is usual to jack up the car-truck and take off the cover of the box, and the cage containing the roller-bearing is withdrawn to inspect the journal and ascertain if it is in proper condition, and at the same time to enable the roller-bearing to be fully inspected I have provided novel roller-supports which may be easily withdrawn from the cage, as the wear, if any, coming upon the bearing after a long run will show upon said supports. Heretofore the exterior of the cylindrical supports on which the balls have rested and rolled has been of the same diameter as that part of the support which enters or is held by the cage ends, and inasmuch as the balls are exceedingly hard and they run on the spindles, which are case-hardened, the spindle at times under the action of the balls in long service may present a bur which is thrown up by the ball, and such bur interferes with the withdrawal of the spindle, for the bur, which is very hard, as the spindle is withdrawn enlarges the hole in and injures the soft cage, it being preferably of soft steel. To overcome this difficulty, I have made the invention to be hereinafter described and claimed—that is, I have made the support to present a surface, which I name a "track," upon which the balls may roll in the operation of the bearing, and I have provided the support at one side of the track with a portion of enlarged diameter, said enlarged portion entering and being held against rotation in the cage end, and in case the track should have a bur when the bearing is being inspected the bur can readily find passage with the track through the cage end without interfering at all with or enlarging the hole in the cage end, which hole receives the larger outer end of the support.

Figure 1 in longitudinal section represents a journal and box and an intermediate traveling cage containing a novel form of bearing-roller support embodying my invention. Fig. 2 is an enlarged detail, better showing the construction of the supports in one chosen form of my invention. Fig. 3 shows a modified support, and Fig. 4 shows the spindle omitted from the track of the support.

The shaft A, having the journal A', the box C, the cage-controllers H and H', and the traveling cage D, having its end walls connected by bars $d$ and bored in alinement to receive suitable supports or spindles to sustain the bearing-rollers B, chambered at their ends to receive antifriction means, such as balls $E^2$, are and may be all as shown in said patent, with the exception of the supports for alining the bearing-rollers.

Instead of employing spindles of uniform diameter on which rest the balls for sustaining the ends of the bearing-rollers I have provided supports presenting surfaces of different cross-section, each of said supports having a surface $a$, which serves as a track for the balls, it being of a less diameter than the portion $a'$ of the support entering the cage ends, and in Figs. 1 and 2 the tracks are connected by a spindle $a^2$, extended through the bearing-rollers, but not contacting therewith. The supports must be restrained from rotation in the cage end, and to effect this I have provided one end of one of the supports (see the right of Fig. 1) with a locking-pin $e$, which is extended through a notch in the enlarged end $a'$ of the sleeve and through the spindle $a^2$, a projecting end of said locking-pin (see Fig. 1) entering a suitable notch leading from the alined hole in the cage end. The opposite support (see the left-hand end of Fig. 1) is also provided with a hole, it coinciding with the hole in the spindle $a^2$, and a cotter-pin 20 is inserted in said hole, said cotter-pin preventing endwise movement of said spindle.

It will be obvious that the locking-pin $e$ restrains rotation of the support and the spindle and that the cotter-pin 20 prevents the withdrawal longitudinally of the spindle and support; but by removing the cotter-pin the spindle and support thereon at the right-hand side of Fig. 1 may be removed, and the support at the left-hand end from which the spindle has been withdrawn may also be removed for inspection.

I prefer to make the supports having the tracks and the portion outside thereof held by the cage ends of larger diameter than the track portion in the form of hardened steel sleeves; yet I consider as within the scope of my invention a spindle $a^3$, such as represented in Fig. 3, it presenting a track $a^4$ and enlarged portion $a^5$ integral with the spindle. I also consider as within the scope of my invention the employment of the supports having the track and connected portion of greater diameter, even though the spindle $a^2$ were entirely omitted, as in Fig. 4, it being only necessary to provide the support with means for restraining it from rotation in the cage end and also from getting out of place when in use. For this purpose I have provided in the modification Fig. 4 a set-screw $a^6$, it passing through a suitable hole in the cage and entering a hole in the support, only the hole in the cage, however, being threaded.

Having described my invention, what I claim as new, and desire to secure by Letters Patent, is—

1. In a roller-bearing, a cage having a series of cylindrical supports, a series of bearing-rollers surrounding said supports, and balls interposed between each of said bearing-rollers and said cylindrical supports, the portions of said cylindrical supports which are in the cage being of greater diameter than the portions of said supports which form the cylindrical tracks for said balls and means to lock said supports against rotation.

2. In a roller-bearing, a cage having roller-alining supports composed of hardened cylindrical sleeves presenting cylindrical portions of smaller diameter than other parts of the supports, to constitute cylindrical ball-tracks, bearing-rollers, balls interposed between the rollers and supports, and means to lock the supports against rotation.

3. In a roller-bearing, a cage having cylindrical roller-alining supports presenting a hardened cylindrical ball-track of smaller diameter than other portions of said supports, bearing-rollers, balls interposed between the rollers and supports, and means to restrain said supports from rotation in said cage.

4. In a roller-bearing, a bearing-roller chambered at its ends, balls within said chamber, a cage having a spindle provided with a detachable ball-track over which the balls may travel in the operation of the bearing.

5. In a roller-bearing, a cage having bearing-rollers chambered at their ends, balls within said chamber, spindles crossing said cage from end to end, and ball-supports surrounding said spindles, said supports being composed of hardened sleeves presenting each a larger diameter at that part thereof which is held in the cage, and a portion of smaller diameter inside of the cage ends to constitute a track for the balls.

6. In a roller-bearing, a series of chambered bearing-rollers, balls in said chambers, a cage, a series of spindles having tracks to sustain said balls, said spindles having at one end a projection coöperating with a notch of the cage to prevent rotation of the spindle in its cage, and means to prevent the endwise movement of said spindle in said cage.

In testimony whereof I have signed my name to this specification in the presence of two subscribing witnesses.

JULIUS A. PERKINS.

Witnesses:
GEO. W. GREGORY,
MARGARET A. DUNN.